US008707709B2

(12) United States Patent
Davis, Jr. et al.

(10) Patent No.: US 8,707,709 B2
(45) Date of Patent: Apr. 29, 2014

(54) SYSTEMS AND METHODS FOR CONTROLLING COMPRESSOR EXTRACTION COOLING

(75) Inventors: Lewis Berkley Davis, Jr., Niskayuna, NY (US); James Henahan, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1036 days.

(21) Appl. No.: 12/415,065

(22) Filed: Mar. 31, 2009

(65) Prior Publication Data
US 2010/0242491 A1 Sep. 30, 2010

(51) Int. Cl.
*F02C 6/08* (2006.01)

(52) U.S. Cl.
USPC ............... 60/782; 60/785; 60/266; 60/267; 60/728; 60/806

(58) Field of Classification Search
USPC ............... 60/782, 785, 266, 267, 728, 806
See application file for complete search history.

(56) References Cited

U.S. PATENT DOCUMENTS

| | | | |
|---|---|---|---|
| 6,581,368 B2 | 6/2003 | Utamura | |
| 6,598,401 B1 | 7/2003 | Utamura | |
| 6,609,360 B2 | 8/2003 | Utamura | |
| 6,644,035 B1 | 11/2003 | Yamanaka et al. | |
| 6,860,109 B2 * | 3/2005 | Tsuji | 60/806 |
| 6,990,815 B2 | 1/2006 | Yamanaka et al. | |
| 7,104,071 B2 * | 9/2006 | Braun et al. | 60/775 |
| 7,367,178 B2 | 5/2008 | Shibata | |
| 2005/0066664 A1 * | 3/2005 | Shibata et al. | 60/775 |
| 2005/0262848 A1 * | 12/2005 | Joshi et al. | 60/772 |
| 2006/0080964 A1 * | 4/2006 | Youssef | 60/772 |
| 2007/0017227 A1 | 1/2007 | Horiuchi et al. | |

FOREIGN PATENT DOCUMENTS

CN 1456795 A 11/2003
JP 2008-291829 A 12/2008

OTHER PUBLICATIONS

Disclosure Statement Under 37 C.F.R. as filed Mar. 31, 2009.
CN Office Action dated Aug. 22, 2013 for Application No. CN101852135A, filed Oct. 6, 2010.

\* cited by examiner

*Primary Examiner* — Phutthiwat Wongwian
*Assistant Examiner* — Craig Kim
(74) *Attorney, Agent, or Firm* — Sutherland Asbill & Brennan LLP

(57) ABSTRACT

Embodiments of methods and apparatus for providing compressor extraction cooling are provided. According to one example embodiment, a method is disclosed for controlling compressor extraction cooling. The method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section. Furthermore, method can include selectively controlling at least one of the compressor extraction air or the cooling medium based at least in part on a characteristic associated with the gas turbine.

20 Claims, 5 Drawing Sheets

SYSTEMS AND METHODS FOR CONTROLLING COMPRESSOR EXTRACTION COOLING

FIELD OF THE INVENTION

The invention relates to rotating machinery, and more specifically relates to systems and methods for controlling compressor extraction cooling.

BACKGROUND OF THE INVENTION

Generally, cooling air extracted from a compressor section of a gas turbine can cause a decrease in overall performance of the gas turbine. When the amount of extracted cooling air is decreased, an increase in the overall performance of the gas turbine can result but a reduction in the life of gas turbine components can also result.

At least one conventional gas turbine uses cooling air extracted from a compressor section to cool various hot gas path components, for instance, in a turbine section. In the conventional gas turbine, a heat exchanger using water from the plant bottoming cycle can cool the air extracted from the compressor. By initially passing the air extracted from the compressor through the heat exchanger, the heat exchanger, by way of the water from the plant bottoming cycle, can remove heat from the air before the air is transmitted to the turbine section. Use of a heat exchanger to cool the extracted compressor air can be relatively expensive due to the maintenance and operation costs of the heat exchanger and associated equipment.

BRIEF DESCRIPTION OF THE INVENTION

Embodiments of the invention can address some or all of the needs described above. According to one embodiment of the invention, there is disclosed a method for controlling compressor extraction cooling. The method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section. Furthermore, method can include selectively controlling at least one of the compressor extraction air or the cooling medium based at least in part on a characteristic associated with the gas turbine.

According to another embodiment of the invention, there is disclosed a system for controlling compressor extraction cooling. The system can include one or more storage devices operable to store a cooling medium. In addition, the system can include one or more distribution devices operable to receive the cooling medium from the one or more storage devices. The one or more distribution devices can be further operable to introduce at least a portion of the cooling medium prior to or during introduction of the cooling medium to the compressor extraction air, wherein the compressor extraction air is cooled by the cooling medium prior to introduction to the turbine section. Furthermore, the system can include one or more control devices operable to selectively control at least one of the compressor extraction air or the cooling medium based at least in part on a characteristic associated with the gas turbine.

According to yet another embodiment of the invention, there is disclosed a gas turbine. The gas turbine can include a turbine section and a compressor, wherein air is extracted from at least one portion of the compressor for introduction into the turbine section. The gas turbine can also include one or more storage devices operable to store a cooling medium. The gas turbine can also include one or more distribution devices operable to receive the cooling medium from the one or more storage devices. In addition, the one or more distribution devices can be further operable to introduce at least a portion of a cooling medium prior to or during introduction of the cooling medium to the air extracted from the at least one portion of the compressor, wherein the air is cooled by the cooling medium prior to introduction to the turbine section. Furthermore, the gas turbine can include one or more control devices operable to selectively control at least one of the compressor extraction air or the cooling medium based at least in part on a characteristic associated with the gas turbine.

Other embodiments, aspects, and features of the invention will become apparent to those skilled in the art from the following detailed description, the accompanying drawings, and the appended claims.

BRIEF DESCRIPTION OF THE DRAWINGS

Figure 1:
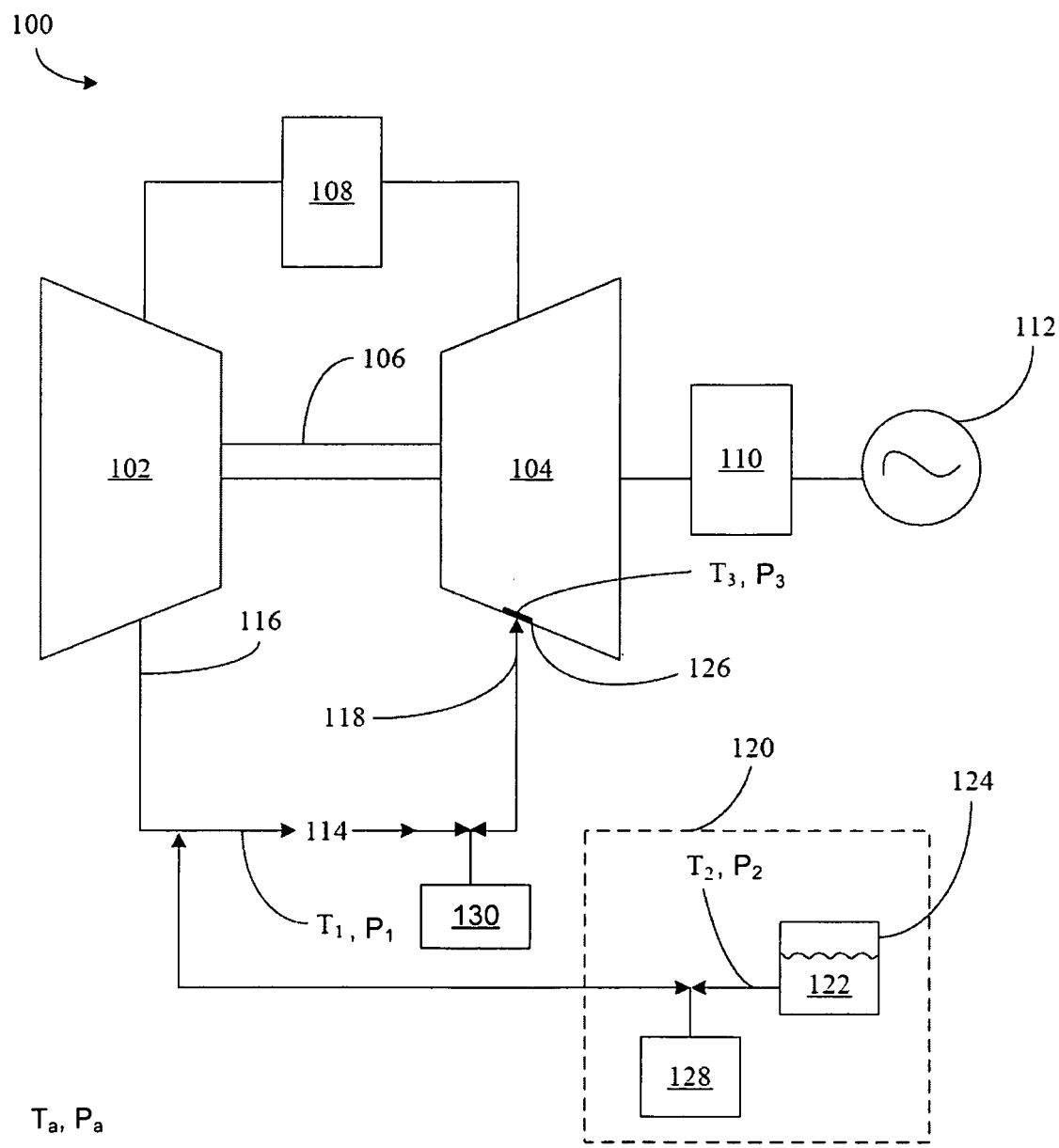

Having thus described the invention in general terms, reference will now be made to the accompanying drawings, which are not necessarily drawn to scale, and wherein:

FIG. 1 illustrates a schematic view of an example system and gas turbine in accordance with an embodiment of the invention.

Figure 2:
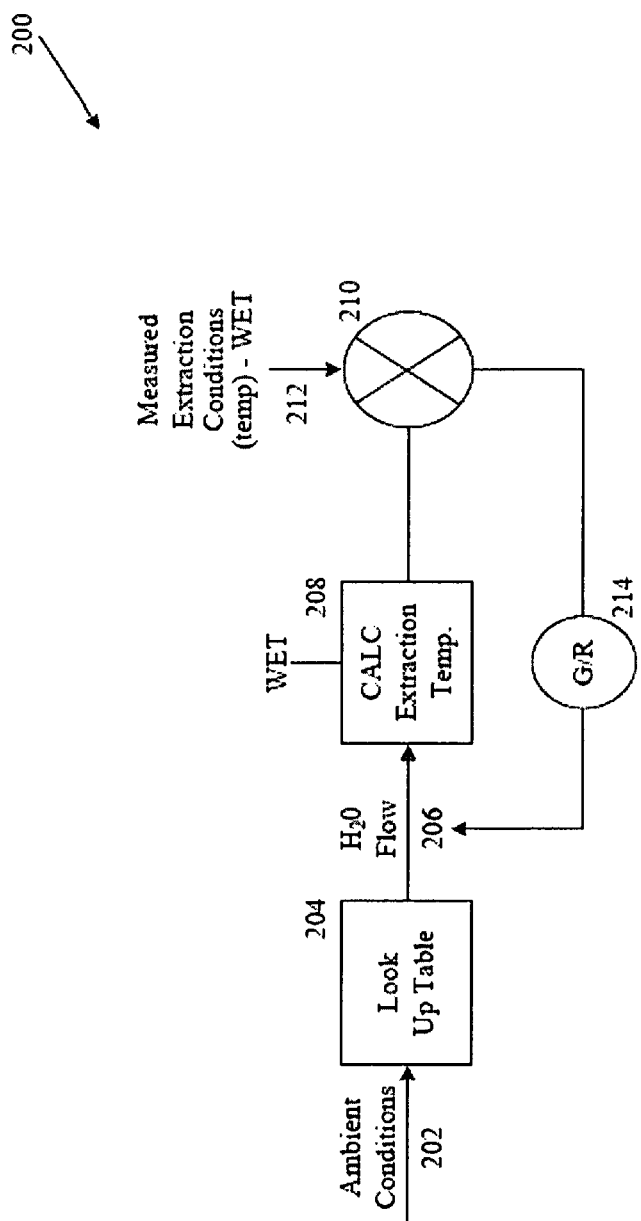

FIG. 2 illustrates an example logic flow diagram for a compressor extraction cooling control system for a gas turbine in accordance with an embodiment of the invention.

Figure 3:
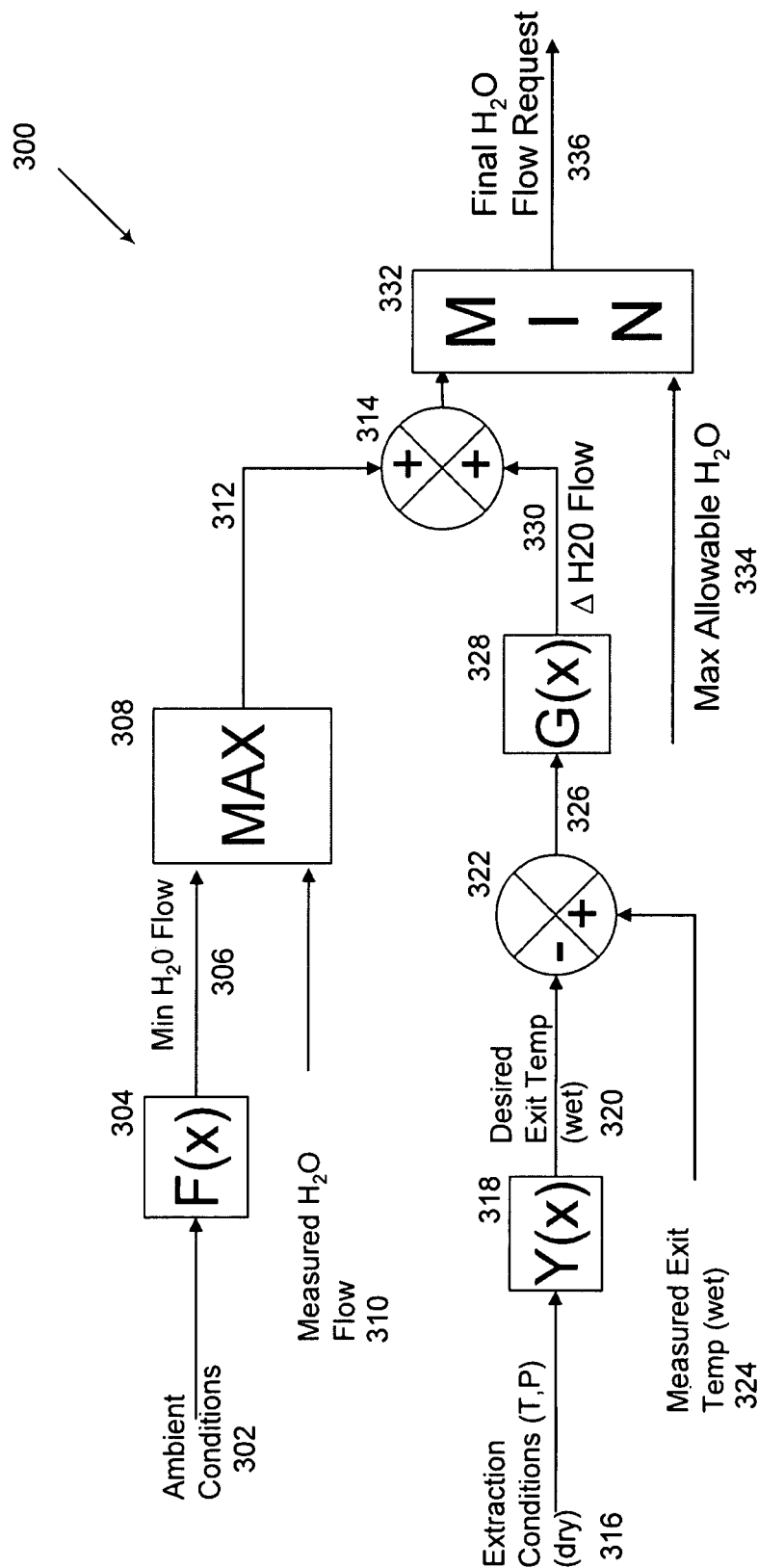

FIG. 3 illustrates another example logic flow diagram for a compressor extraction cooling control system for a gas turbine in accordance with an embodiment of the invention.

Figure 4:
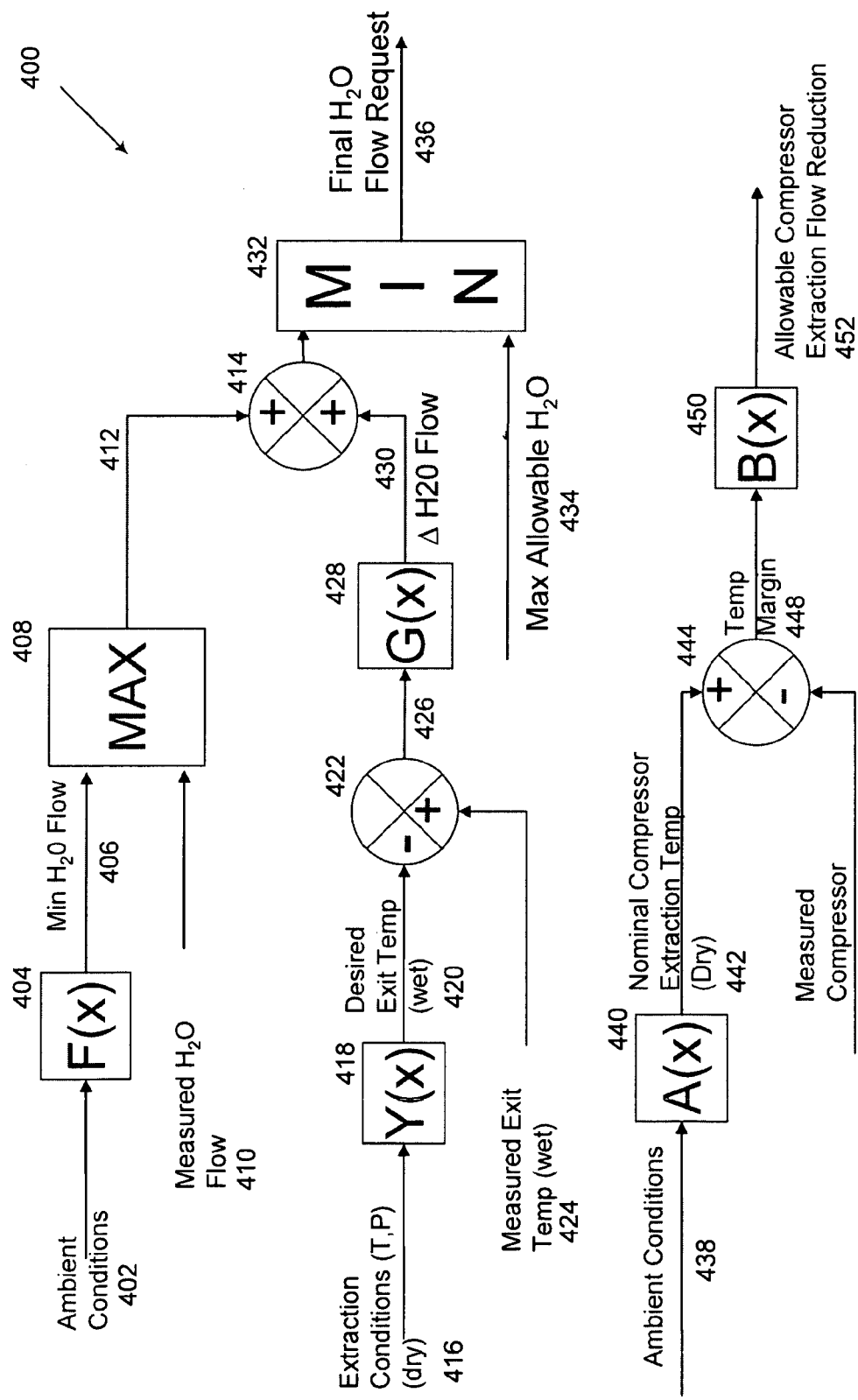

FIG. 4 illustrates another example logic flow diagram for a compressor extraction cooling control system for a gas turbine in accordance with an embodiment of the invention.

Figure 5:
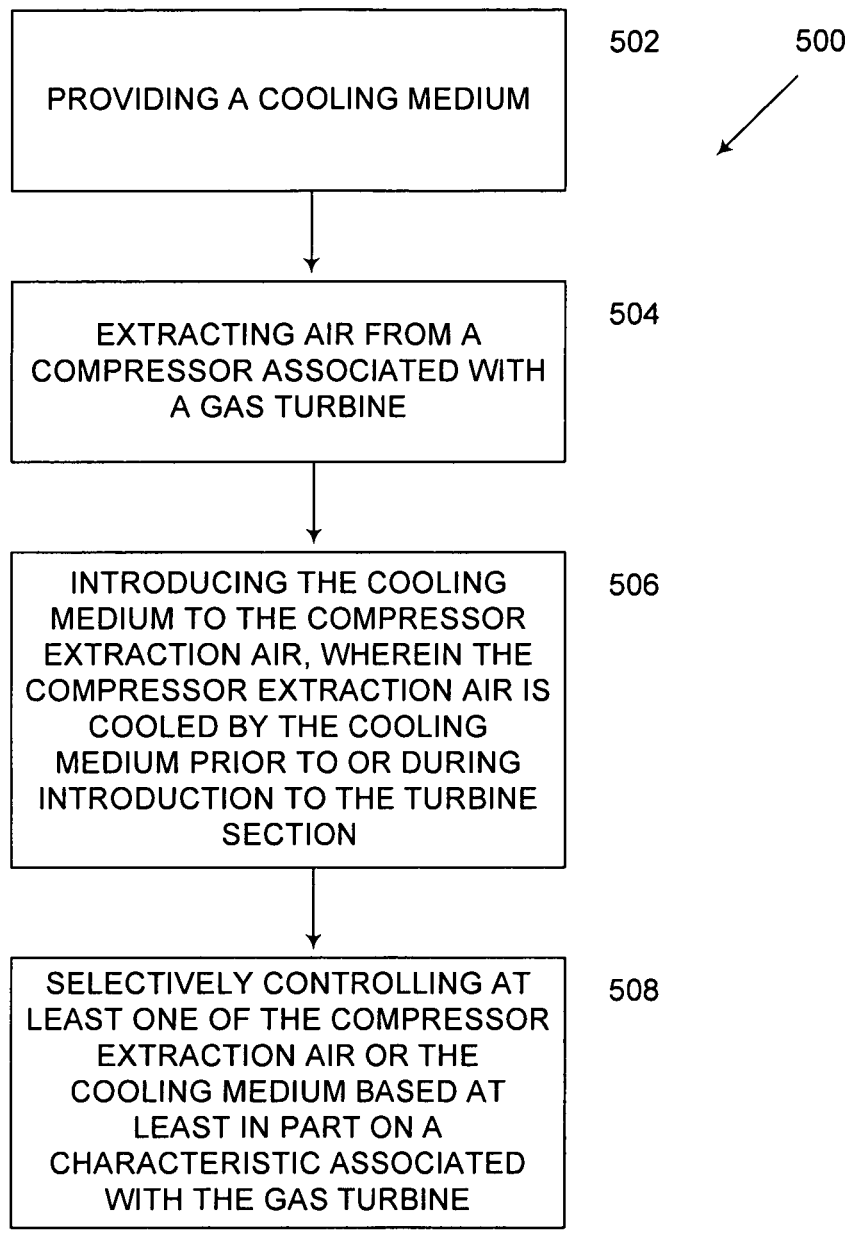

FIG. 5 illustrates an example method in accordance with an embodiment of the invention.

DETAILED DESCRIPTION OF THE INVENTION

Illustrative embodiments of the invention now will be described more fully hereinafter with reference to the accompanying drawings. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems and methods for controlling compressor extraction cooling. In one embodiment, a method can include providing a cooling medium. The method can include extracting air from a compressor associated with a gas turbine. The method can also include introducing the cooling medium to the compressor extraction air, wherein the compressor extraction air is cooled by the cooling medium prior to or during introduction to the turbine section. Furthermore, method can include selectively controlling at least one of the compressor extraction air or the cooling medium based at least in part on a characteristic associated with the gas turbine. According to another embodiment of the invention, a system for providing compressor extraction cooling can be provided. The system can include one or more storage devices operable to store a cooling medium. In addition, the system can include one or more distribution devices operable to receive the cooling medium from the one or more storage devices. The one or more distribution devices can be further operable to introduce at least a portion of the cooling medium prior to or during introduction of the cooling medium to the compressor extraction air, wherein the compressor extraction air is cooled by the cooling medium prior to introduction to the turbine section. Furthermore, the system can include one or more control devices operable to selectively control at least one of the compressor extraction air or the cooling medium based at least in part on a characteristic associated with the gas turbine. In either embodiment, new an/or retrofitted gas turbines utilizing certain embodiments of the system and/or method can be operated at approximately the rated firing temperature at relatively hot ambient temperatures. Thus, as a result of the reduced temperature of the compressor extraction air, certain embodiments of the system and method as well as associated gas turbines can have the technical effect of improving gas turbine performance and maintaining or otherwise increasing gas turbine component life.

FIG. 1 illustrates a schematic view of an example system and gas turbine in accordance with an embodiment of the invention in accordance with an embodiment of the invention. FIG. 1 shows certain components of an example gas turbine 100, which includes a compressor 102, a turbine 104, a shaft 106 connecting the compressor 102 and turbine 104, and a combustor 108. In the embodiment shown in FIG. 1, the compressor 102 compresses and discharges gas, and the combustor 108 receives the compressed gas to initiate a combustion process. Combustion gases from the combustor 108 drive the turbine 104, which turn the shaft 106 to drive a generator 110. The generator 110, in turn, generates power for output to an electric grid 112. In the embodiment shown in FIG. 1, air 114 from the compressor can be extracted from one or more stages 116 associated with the compressor 102. The air 114 from such stages 116 can generally be referred to as "compressor extraction air." Generally, the compressor extraction air can be routed to or otherwise transmitted to one or more portions 118 of the turbine 104, where the air 114 can cool relatively hot gas path components associated with the turbine 104.

As shown in FIG. 1, temperatures and pressures associated with certain portions of the gas turbine 100 are respectively indicated by T1, T2, T3, P1, P2, and P3. For example, the temperature of the compressor extraction cooling air is indicated as T1, and the pressure of the compressor extraction cooling air is indicated as P1. Other temperatures T2 and T3, and pressures P2 and P3 are described in further detail below. Ambient temperature and pressure, Ta and Pa, are indicated and measured outside of the gas turbine 100. These and other temperatures and pressures throughout the gas turbine 100 can be measured or otherwise obtained by respective sensors, thermocouples, or other monitoring devices.

Also shown in FIG. 1, a compression extraction air system 120 can be mounted to or can otherwise be retrofitted to the gas turbine 100. The system 120 can include a supply of one or more cooling mediums, such as water 122. The one or more cooling mediums, such as water 122, can be stored in one or more respective storage devices 124. In other embodiments, multiple cooling mediums can be stored in respective storage devices similar to 124. The temperature of the cooling medium, or water 122 in this example, is indicated by T2.

In certain embodiments, a cooling medium can include, but is not limited to, water, a fluid, a gas, or any liquid or compressed gas.

In certain embodiments, a storage device can include, but is not limited to, a tank, a reservoir, or any other device capable of storing said cooling medium. In some embodiments, a cooling medium may be stored off site or remote to the gas turbine, and may be periodically or continuously transmitted to the gas turbine via piping or other suitable devices.

Also shown in FIG. 1, the system 120 can include one or more distribution devices 126 in communication with the one or more storage devices 124. In this embodiment, the one or more distribution devices 126 can receive at least a portion of the cooling medium, such as water 122, from the one or more storage devices 124. The one or more distribution devices 126 can be further operable to introduce at least a portion of the received cooling medium or water 122 to the compressor extraction air 114, wherein the compressor extraction air 114 is cooled by the cooling medium or water 122 prior to or during introduction to the turbine 104. In other embodiments, multiple distribution devices can introduce multiple, respective cooling mediums, such as from multiple storage devices, to the compressor extraction air 114. In any instance, the relatively cooler temperature T2 of the cooling medium, in this example water 122, can reduce the relatively hotter temperature T1 of the compressor extraction air 114 to a temperature T3 during the introduction to the turbine 104. In this example, T1 and P1 are known as dry measurements since the measurements are taken prior to introduction of a cooling medium to the compressor extraction air, and T3 and P3 are known as wet measurements since the measurements are taken during or after introduction of the cooling medium to the compressor extraction air. Thus, as a result of the reduced temperature of the compressor extraction air, example embodiments of the system can have the technical effect of substantially increasing turbine performance.

In certain embodiments, a distribution device can include, but is not limited to, an atomizer, a fogger, a spritzing device, a nozzle, a manifold, or any other device capable of distributing a cooling medium.

Also shown in FIG. 1, the compression extraction air system 120 can include one or more processors, for example 128, operable to control the one or more distribution devices 126 and the respective rates of introduction of the cooling medium, such as water 122, to the air 114 extracted from the at least one portion of the compressor 102. In this and other embodiments, one or more processors such as 130 and other control-type devices can be operable to control the amount of air 114 extracted from the at least one portion of the compressor 102. In certain embodiments, one or more processors similar to 128 and 130 and other control-type devices can be operable to selectively control at least one of the amount of air 114 or rate of introduction of the cooling medium such as water 122. In this embodiment, the one or more processors 128 can obtain feedback from any number of sensors positioned throughout the gas turbine 100 to control or otherwise operate the one or more distribution devices 126. Likewise, one or more processors and other control-type devices operable to control the amount of air 114 extracted from the at least one portion of the compressor 102 can obtain feedback from any number of sensors positioned throughout the gas turbine 100 to control or otherwise operate the amount of air 114. In certain embodiments, one or more processors and other control-type devices operable to control the amount of air 114 extracted from the at least one portion of the compressor 102 can obtain feedback from any number of sensors positioned throughout the gas turbine 100 to selectively control or otherwise operate the amount of air 114 or rate of introduction of the cooling medium such as water 122.

In one embodiment, an example distribution device for the system and gas turbine in accordance with an embodiment of the system can be a distribution device. The distribution device can include, for example, an inlet, a nozzle head, and a distributer portion. In this embodiment, the distribution device can mount to a portion of a gas turbine between at least one compressor stage, such as 116 in FIG. 1, and at least one portion of the turbine, such as 118 in FIG. 1. The inlet can receive at least one cooling medium, such as water 120 in FIG. 1. The nozzle head, in communication with the inlet, can receive the at least one cooling medium, such as water 120, from the inlet. The distributer portion, in communication with the nozzle head, can distribute the at least one cooling medium, such as water 120, and introduce at least a portion of the at least one medium, such as water 120, to a turbine section, such as 104 in FIG. 1.

FIGS. 2-4 illustrate example logic flows which can be implemented with a compressor extraction cooling control system for a gas turbines, such as 100 in FIG. 1. FIG. 2 illustrates an example logic flow diagram for a compressor extraction cooling control system for a gas turbine in accordance with an embodiment of the invention. The logic flow diagram illustrates an example control algorithm 200 for a compressor extraction cooling control system, in which the algorithm 200 can control an amount of cooling medium introduced to compressor extraction air or to a turbine. A control algorithm, such as 200, can be implemented as a set of computer-executable instructions stored on a computer-readable medium, for instance, one or more processors 128, software, hardware, or any combination thereof Other suitable control algorithms in accordance with embodiments of the invention can include the elements described below as well as fewer or greater numbers of elements than those explained below.

The example control algorithm 200 begins at input arrow 202. At input arrow 202, one or more ambient condition measurements are received. Ambient conditions can include, but are not limited to, ambient temperature, ambient pressure, humidity, time, or date. In this embodiment, the ambient conditions can be measured by one or more sensors at or near an air inlet for the gas turbine 100 or system 120.

Input arrow 202 leads to block 204, in which one or more ambient conditions are processed by at least one function, for instance F(x), associated with block 204. Block 204 can implement any number of functions, including algorithms, polynomials, exponentials, transfer functions, look up tables, or any combination thereof. For example, in the embodiment shown in FIG. 2, a lookup table implemented at block 204 can include previously stored conditions such as a series of temperatures, pressures, humidities, and corresponding mass flow rates. In one embodiment, a mass flow rate for a cooling medium, such as water 122, can be selected when an ambient temperature and pressure exist or are otherwise measured. The selected mass flow rate for the cooling medium can be selected based at least in part on the desired or expected effect the cooling medium will have on the compressor extraction air, such as 114. For instance, if the ambient condition of approximately 100 degrees is measured and input to the lookup table, a mass flow rate of about 3 pounds per second can be output. Thus, when one or more ambient condition measurements are received from input arrow 202, the ambient condition measurements can be compared to conditions in the associated lookup table of block 204, or otherwise processed by an associated function F(x) associated with block 204, and a selected mass flow rate for the cooling medium can be output from block 204.

In one embodiment, the selected mass flow rate from block 204 alone can be used to control compressor extraction cooling. In such an embodiment, the use of the one or more ambient conditions with a lookup table containing previously stored conditions can be used to output a selected mass flow rate for a cooling medium, which can be used to control compressor extraction cooling. Once the selected mass flow rate has been determined in block 204, the selected mass flow rate 206 can be used without additional modification to control one or more storage devices 124, one or more distribution devices 126 and/or one or more processors 128 to facilitate providing the selected mass flow rate of cooling medium to the compressor extraction air. For example, the selected mass flow rate can be provided to at least one processor 128, which can in turn provide suitable control commands to any number of storage devices 124 and/or distribution devices 126 to facilitate the selected mass flow rate of the cooling medium.

In one embodiment, additional sensors and calculations may be used to give feedback to the control system. In such an embodiment, the remaining sensors and calculations in FIG. 2 will also be used to control the mass flow rate. Turning back to block 204, once the selected mass flow rate has been output, output arrow 206 leads to block 208. In block 208, an expected cooled or wet extraction temperature calculation is made. For example, based on the previous example, if an ambient temperature of 100 degrees exists and a cooling medium mass flow rate of about 3 pounds per second is selected, then block 208 can utilize this information to determine an expected cooled or wet extraction temperature, such as about 400 degrees. In this embodiment, a suitable algorithm or function can be used to determine the expected cooled or wet extraction temperature.

In one embodiment, the expected temperature reduction caused by a given amount of cooling medium flow, such as water flow, can be calculated using thermodynamic properties of the air and water streams to be mixed. In certain instances, this thermodynamic properties calculation can be determined using a processor-based, active control system. In other instances, a suitable function or transfer function developed and/or based at least in part on the aforementioned thermodynamic properties can be used to calculate the expected extraction temperature. This function or transfer function can be used in a control system to calculate the expected extraction temperature rather than using calculated thermodynamic properties. A suitable function or transfer function may be, for example, of the following form:

$$T_{wet} = T_{Dry} - K * \dot{W}_{H_2O}$$

Where: $T_{wet}$=temperature of extraction air after cooling
$T_{dry}$=temperature of extraction air before cooling
K=a calculated constant based on thermodynamic properties
$\dot{W}_{H_2O}$=Water flow Other suitable functions or transfer functions may be more complex. Other suitable functions or transfer functions may utilize more advanced math including, but not limited to, exponentials and/or polynomials. Furthermore, in certain embodiments, a lookup table may be utilized rather than an actual function or transfer function.

Block 208 is followed by block 210, in which an input 212 of an actual or measured cooled or wet extraction temperature is received and compared to the expected cooled or wet extraction temperature from block 208. Based at least in part on the difference between the input 212 and the output from block 208, one or more control commands can be implemented by way of one or more storage devices 124, one or more distribution devices 126 and/or one or more processors 128 to facilitate reducing the difference between the actual or measured cooled or wet extraction temperature and the expected cooled or wet extraction temperature. For instance, based on preceding example, if the actual or measured cooled or wet extraction temperature is about 450 degrees, a difference between the actual or measured cooled or wet extraction temperature and the expected cooled or wet extraction temperature is approximately 50 degrees, and a suitable gain/reduction factor at block 214 can be determined and applied to the difference.

At block 214, a gain/reduction factor can be applied to the difference to suitably adjust the selected mass flow rate of the cooling medium input to block 208. As the difference between the input 212 and the output from block 208 decreases in block 212, the gain/reduction factor of block 214 applied to the difference decreases, and ultimately when the difference measures approximately zero or another predetermined number, no further gain/reduction factor need be applied at block 214.

In one embodiment, a suitable gain/reduction factor could be determined using a suitable function including a proportional constant that can be applied to the temperature difference. For example, the water flow could be calculated as follows:

$$H_2O \text{ (new)} = H_2O \text{ (current)} + K^*(T_{desired} - T_{measured})$$

Where: K=some predetermined constant based at least in part on one or more thermodynamic properties.

FIG. 3 illustrates another logic flow diagram for a compressor extraction cooling control system for a gas turbine in accordance with an embodiment of the invention. The logic flow diagram illustrates an example control algorithm 300 for a compressor extraction cooling control system, in which the algorithm 300 can control an amount of cooling medium introduced to compressor extraction air or to a turbine. A control algorithm, such as 300, can be implemented as a set of computer-executable instructions stored on a computer-readable medium, for instance, one or more processors 128, software, hardware, or any combination thereof. Other suitable control algorithms in accordance with embodiments of the invention can include the elements described below as well as fewer or greater numbers of elements than those explained below.

The example control algorithm 300 begins at input arrow 302. At input arrow 302, one or more ambient condition measurements are received similar to input arrow 202 in FIG. 2. Ambient conditions can include, but are not limited to, ambient temperature, ambient pressure, humidity, time, or date. In this embodiment, the ambient conditions can be measured by one or more sensors at or near an air inlet for the gas turbine 100 or system 120.

Input arrow 302 leads to block 304, similar to block 204 in FIG. 2, in which one or more ambient conditions are processed by at least one function, for instance F(x). Similar to block 204 described above, block 304 can implement any number of functions, including algorithms, polynomials, exponentials, transfer functions, look up tables, or any combination thereof For example, in the embodiment shown in FIG. 3, a lookup table implemented at block 304 can include previously stored conditions such as a series of temperatures, pressures, humidities, and corresponding mass flow rates. In one embodiment, a mass flow rate for a cooling medium, such as water 122, can be selected when an ambient temperature and pressure exist or are otherwise measured. The selected mass flow rate for the cooling medium can be selected based at least in part on the desired or expected effect the cooling medium will have on the compressor extraction air, such as 114. For instance, if the ambient condition of approximately 100 degrees is measured and input to the lookup table, a mass flow rate of about 3 pounds per second can be output. Thus, when one or more ambient condition measurements are received from input arrow 302, the ambient condition measurements can be compared to conditions in the associated lookup table of block 304, or otherwise processed by an associated function, for instance F(x), associated with block 304, and a selected mass flow rate for the cooling medium can be output from block 304.

Once the selected mass flow rate has been output from block 304, output arrow 306 leads to block 308. Block 308 can receive an input 310 of a measured mass flow rate associated with the cooling medium, and compare the output 306 of a selected mass flow rate with the input 310 of a measured mass flow rate to determine the greater or maximum value between the two 306, 310. In any instance, block 308 can output 312 a maximum mass flow rate to comparison block 314, which is explained in further detail below.

Another input to comparison block 314 is generated beginning at input arrow 316. Input arrow 316 represents one or more measured dry compressor extraction conditions, for example, temperature and/or pressure. Input arrow 316 leads to block 318, in which a suitable function Y(x) determines a desired or expected cooled or wet compressor extraction temperature. For example, if a measured dry compressor extraction temperature of about 600 degrees exists, then block 318 can utilize this information to determine an output 320 of a desired or expected cooled or wet extraction temperature, such as about 500 degrees. In this embodiment, a suitable function, such as a transfer function, can be used to determine the desired or expected cooled or wet extraction temperature.

In one embodiment, a suitable function or transfer function can be developed based at least in part on a physics-based model including one or more thermodynamic properties calculations. The form of a suitable function or transfer function can include any number of algorithms, polynomials, exponentials, or other types of equations.

The output 320 is received by block 322, at which another input 324 of an actual or measured cooled or wet extraction temperature can be received and compared to the expected cooled or wet extraction temperature from block 318. At block 322, a determination of the difference between output 320 and input 324 can be made, which can represent the difference between the expected cooled or wet extraction temperature and the actual or measured cooled or wet extraction temperature. In any instance, an output 326 associated with the difference can be received by block 328.

At block 328, a gain/reduction factor can be determined or otherwise applied to suitably reduce the difference between the actual or measured cooled or wet extraction temperature and the expected cooled or wet extraction temperature. For example, a function such as G(x) can be applied to the difference to output 330 a gain/reduction factor. The output 330 associated with the gain/reduction factor from block 328 can be input to block 314 to suitably change the selected mass flow rate for the cooling medium. As the difference between the input 324 and the output 320 from block 318 decreases in block 322, the gain/reduction factor applied at block 328 to the difference decreases, and ultimately when the difference measures approximately zero or another predetermined number, no further gain/reduction factor need be determined or otherwise applied at block 328 and/or input to block 314 to change the selected mass flow rate for the cooling medium. For instance, based on preceding example, if the actual or measured cooled or wet extraction temperature is about 550 degrees, a difference between the actual or measured cooled or wet extraction temperature and the expected cooled or wet extraction temperature is approximately 50 degrees, and an output 330 of a suitable gain/reduction factor can be determined and applied to the difference to determine an adjusted or modified selected mass flow rate at block 314.

Turning back to block 314, after any changes to the selected mass flow rate for the cooling medium have been implemented, an output 332 of the adjusted or modified selected mass flow rate is compared at block 334. At block 334, an input 336 of a maximum allowable mass flow rate for the cooling medium is compared to the output 332 associated with the adjusted or modified selected mass flow rate from block 314. Block 334 can determine a minimum mass flow rate or lesser value between the output 332 associated with the adjusted or modified selected mass flow rate from block 314 and the maximum allowable mass flow rate for the cooling medium. Output 336 from block 334 represents a final mass flow rate determination, which can be used to request a particular desired mass flow rate of the cooling medium.

Based at least in part on the output 336, one or more control commands can be implemented by way of one or more storage devices 124, one or more distribution devices 126 and/or one or more processors 128 to facilitate reducing the difference between the actual or measured cooled or wet extraction temperature and the expected cooled or wet extraction temperature.

The algorithm 300 can end after output arrow 336.

In one embodiment, one or more control devices can control the mass flow rate and temperature of the compressor extraction air for cooling the turbine section as well as associated hot gas path and rotor elements. In one aspect of this embodiment, compressor extraction air flow rate can be actively controlled, and a variable amount of cooling medium can be introduced or otherwise injected in a mist-like form into the air flow stream to reach a target temperature or other characteristic associated with the gas turbine. Active control in this embodiment can include monitoring temperature, pressure, and mass flow measurements for both the compressor extraction air and the cooling medium. One or more control devices implementing an active-type control can actively control the amount of cooling medium flow and the temperature of the cooling medium to suitably cool the compressor extraction air. In certain instances, component life and gas turbine performance can be estimated, and the one or more control devices can compare component life and gas turbine performance estimates to optimize component life and/or gas turbine performance.

In another embodiment, one or more control devices can implement an open loop controller operable to access one or more tables or look-up tables with one or more predefined target characteristics associated with the gas turbine. Target characteristics can include compressor extraction air flow rate and/or cooling medium flow rate.

In another embodiment, one or more control devices can implement a closed loop controller which actively controls the cooling medium flow rate and/or temperature. In one aspect of this embodiment, the closed loop controller can actively control the cooling medium flow rate and/or temperature depending on certain downstream component metal temperatures associated with the turbine section.

In another embodiment, one or more control devices can implement a closed loop controller which actively controls the cooling medium flow rate and/or temperature. In one aspect of this embodiment, the closed loop controller can actively control the cooling medium flow rate and/or temperature depending on certain downstream component metal temperatures associated with the turbine section.

FIG. 4 illustrates another example logic flow diagram for a compressor extraction cooling control system for a gas turbine in accordance with an embodiment of the invention. The logic flow diagram illustrates an example control algorithm 400 for a compressor extraction cooling control system, in which the algorithm 400 can control at least one of an amount of compressor extraction air or an amount of cooling medium introduced to compressor extraction air or to a turbine. A control algorithm, such as 400, can be implemented as a set of computer-executable instructions stored on a computer-readable medium, for instance, one or more processors similar to 128 and 130, software, hardware, or any combination thereof. Other suitable control algorithms in accordance with embodiments of the invention can include the elements described below as well as fewer or greater numbers of elements than those explained below.

The example control algorithm 400 includes logic to control an amount of cooling medium introduced to compressor extraction air or to a turbine. Elements numbered 402-436 in FIG. 4 correspond directly with elements 302-336 in FIG. 3, and elements 402-436 function substantially similar to those described in elements 302-336 above. In addition, the control algorithm 400 includes logic to control an amount of compressor extraction air. Input arrow 438 begins this portion of the logic.

At input arrow 438, one or more ambient condition measurements are received. Ambient conditions can include, but are not limited to, ambient temperature, ambient pressure, humidity, time, or date. In this embodiment, the ambient conditions can be measured by one or more sensors at or near an air inlet for the gas turbine 100 or system 120.

Input arrow 438 leads to block 440, in which one or more ambient conditions are processed by at least one function, for instance A(x). Block 440 can implement any number of functions, including algorithms, polynomials, exponentials, transfer functions, look up tables, or any combination thereof. For example, in the embodiment shown in FIG. 4, a lookup table implemented at block 440 can include previously stored conditions such as a series of temperatures, pressures, humidities, and corresponding mass flow rates. In one embodiment, nominal dry temperature for compressor extraction air, such as 114, can be selected when an ambient temperature and pressure exist or are otherwise measured. The nominal dry temperature for the compressor extraction air can be selected based at least in part on the desired or expected cooling effect the compressor extraction air will have on the turbine 104. For instance, if the ambient condition of approximately 100 degrees is measured and input to the lookup table, a nominal dry temperature for the compressor extraction air of about 600 degrees can be output. Thus, when one or more ambient condition measurements are received from input arrow 438, the ambient condition measurements can be compared to conditions in the associated lookup table of block 440, or otherwise processed by an associated function, for instance A(x), associated with block 440, and a nominal dry temperature for the compressor extraction air can be output from block 440.

Once the nominal dry temperature for the compressor extraction air has been output, output arrow 442 leads to block 444. Another input 446 to block 444 is a measured wet compressor extraction temperature. Using the nominal dry temperature and the measured wet compressor extraction temperature, in block 444, a temperature margin calculation is made based at least in part on the difference between the nominal dry temperature and the measured wet compressor extraction temperature. In this embodiment, a suitable algorithm or function can be used to determine the temperature margin.

An output 448 associated with the temperature margin from block 444 is input to function block 450. In function block 450, a suitable algorithm or function such as B(x) can determine an allowable compressor extraction flow rate reduction or increase. Block 450 can implement any number of functions, including algorithms, polynomials, exponentials, transfer functions, look up tables, or any combination thereof. From block 450, an output 452 representing the allowable compressor extraction flow rate reduction or increase can be obtained.

Based at least in part on the output 452, one or more control commands can be implemented by way of one or more storage devices 124, one or more distribution devices 126 and/or one or more processors 128 to facilitate reducing the difference between the nominal dry compressor extraction temperature and the measured wet extraction compressor extraction temperature.

The algorithm 400 can end after output arrow 452.

FIG. 5 is a flowchart illustrating an example method 500 for controlling compressor extraction cooling in a gas turbine in accordance with an embodiment of the invention. In the embodiment shown, the example method 500 can be implemented to control cooling of compressor extraction air associated with a gas turbine, such as the gas turbine 100 in FIG. 1.

The example method begins at block 502. At block 502, a cooling medium is provided. In this embodiment, the cooling medium provided can be water, such as 122 in FIG. 1, stored in one or more respective storage devices 124.

In one aspect of an embodiment, the cooling medium can include at least one of the following: water, a fluid, a gas, or any liquid or compressed gas.

In one aspect of an embodiment, the characteristic can include at least one of: a downstream pressure in the turbine section, a downstream air temperature in the turbine section, a downstream metal temperature of a portion of the turbine section, ambient temperature, an air flow measurement associated with the compressor extraction air, a pressure measurement associated with the compressor extraction air, a temperature measurement associated with the compressor extraction air, a cooling medium flow measurement, a cooling medium temperature, a cooling medium pressure, or any combination thereof.

In one aspect of an embodiment, providing a cooling medium can include providing one or more distribution devices operable to distribute at least a portion of the cooling medium prior to or during introduction of the cooling medium to the compressor extraction air.

Block 502 is followed by block 504, in which air from a compressor associated with a gas turbine is extracted. In this embodiment, air such as 114 in FIG. 1 from a compressor such as 102 can be extracted from one or more stages such as 116 associated with the compressor 102.

Block 504 is followed by block 506, in which the cooling medium is introduced to the compressor extraction air, wherein the compressor extraction air is cooled by the cooling medium prior to or during introduction to the turbine section. In this embodiment, one or more distribution devices such as 126 in FIG. 1 can introduce at least a portion of the received cooling medium or water 122 to the compressor extraction air 114, wherein the compressor extraction air 114 is cooled by the cooling medium or water 122 prior to or during introduction to the turbine such as 104.

Block 506 is followed by block 508, in which at least one of the compressor extraction air or the cooling medium is selectively controlled based at least in part on a characteristic associated with the gas turbine. In this embodiment, one or more processors such as 128 in FIG. 1 can control one or more distribution devices such as 126 and the respective rates of introduction of the cooling medium, such as water 122, to the air such as 114 extracted from the at least one portion of the compressor 102. Furthermore, in this embodiment, the one or more processors 128 can obtain feedback from any number of sensors positioned throughout the gas turbine 100 to control or otherwise operate the one or more distribution devices 126. In another embodiment, one or more processors such as 130 can control one or more control-type or distribution devices and the amount of air such as 114 extracted from the at least one portion of the compressor 102. Furthermore, in such an embodiment, the one or more processors similar to 128 and 130 can obtain feedback from any number of sensors positioned throughout the gas turbine 100 to control or otherwise operate the one or more control-type or distribution devices to control the amount of air 114.

In one aspect of an embodiment, selectively controlling at least one of the compressor extraction air or the cooling medium based at least in part on a characteristic associated with the gas turbine comprises at least one of the following: controlling the amount of cooling medium introduced to the compressor extraction air, controlling the temperature of the cooling medium introduced to the compressor extraction air, controlling the pressure of the cooling medium introduced to the compressor extraction air, controlling the amount of compressor extraction air introduced to the turbine section, controlling the temperature of compressor extraction air introduced to the turbine section, controlling the pressure of compressor extraction air introduced to the turbine section, or any combination thereof.

In one aspect of an embodiment, the one or more control devices can implement at least one of the following: an open-type loop control, an active-type control, a closed-type loop control, or a passive-type control.

In one aspect of an embodiment, selectively controlling at least one of the compressor extraction air or the cooling medium based at least in part on a characteristic associated with the gas turbine can be facilitated by an open-type loop controller comprising a table with one or more predefined target characteristics associated with the gas turbine.

In one aspect of an embodiment, introducing the cooling medium to the compressor extraction air comprises distributing at least a portion of the cooling medium and introducing at least the distributed portion of the cooling medium to the compressor extraction air.

In one aspect of an embodiment, selectively controlling at least one of the compressor extraction air or the cooling medium based at least in part on a characteristic associated with the gas turbine is facilitated by at least one processor.

In one embodiment, the method 500 can include mounting one or more distribution devices to the gas turbine, wherein the one or more distribution devices can distribute at least a portion of the cooling medium prior to or during introduction of the cooling medium to the compressor extraction air.

In one embodiment, the method 500 can include distributing at least a portion of the cooling medium prior to or during introduction of the cooling medium to the compressor extraction air, wherein the compressor extraction air is cooled by the distributed cooling medium prior to introduction to the turbine section.

The method 500 ends after block 508.

The example elements of FIG. 5 are shown by way of example, and other process embodiments can have fewer or greater numbers of elements, and such elements can be arranged in alternative configurations in accordance with other embodiments of the invention.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims.

This written description uses examples to disclose the invention, including the best mode, and also to enable any person skilled in the art to practice the invention, including making and using any devices, apparatus, or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The claimed invention is:

1. A method for controlling compressor extraction cooling in a gas turbine comprising a compressor and a turbine section, the method comprising:
   providing a plurality of different cooling mediums;
   extracting air from a compressor associated with a gas turbine;
   injecting the different cooling mediums into the compressor extraction air, wherein the compressor extraction air is cooled by the cooling mediums prior to or during introduction to the turbine section;
   determining, after injection of the different cooling mediums, an expected temperature of the compressor extraction air and a measured temperature of the compressor extraction air;
   adjusting, based at least in part on a temperature difference between the expected temperature and the measured temperature, respective amounts of the cooling mediums injected into the compressor extraction air; and
   selectively controlling at least one of the compressor extraction air or the cooling mediums based at least in part on a characteristic associated with the gas turbine.

2. The method of claim 1, wherein the characteristic comprises at least one of: a downstream pressure in the turbine section, a downstream air temperature in the turbine section, a downstream metal temperature of a portion of the turbine section, ambient temperature, an air flow measurement associated with the compressor extraction air, a pressure measurement associated with the compressor extraction air, a temperature measurement associated with the compressor extraction air, a cooling medium flow measurement, a cooling medium temperature, a cooling medium pressure, or any combination thereof.

3. The method of claim 1, wherein selectively controlling at least one of the compressor extraction air or the cooling medium based at least in part on a characteristic associated with the gas turbine comprises at least one of the following: controlling the amount of each cooling medium introduced to the compressor extraction air, controlling the temperature of each cooling medium introduced to the compressor extraction air, controlling the pressure of each cooling medium introduced to the compressor extraction air, controlling the amount of compressor extraction air introduced to the turbine section, controlling the temperature of compressor extraction air introduced to the turbine section, controlling the pressure of compressor extraction air introduced to the turbine section, or any combination thereof.

4. The method of claim 1, wherein selectively controlling at least one of the compressor extraction air or the cooling mediums based at least in part on a characteristic associated with the gas turbine is facilitated by at least one of the following: an open-type loop control, an active-type control, a closed-type loop control, or a passive-type control.

5. The method of claim 1, wherein selectively controlling at least one of the compressor extraction air or the cooling mediums based at least in part on a characteristic associated with the gas turbine is facilitated by an open-type loop controller comprising a table with one or more predefined target characteristics associated with the gas turbine.

6. The method of claim 1, further comprising:
   mounting one or more distribution devices to the gas turbine, wherein the one or more distribution devices can distribute at least a portion of the cooling mediums prior to or during introduction of the cooling mediums to the compressor extraction air.

7. The method of claim 1, wherein providing the plurality of different cooling mediums comprises providing one or more distribution devices operable to distribute at least a portion of the cooling mediums prior to or during introduction of the cooling mediums to the compressor extraction air.

8. The method of claim 1, wherein introducing the cooling mediums to the compressor extraction air comprises distributing at least a portion of the cooling mediums and introducing at least the distributed portion of the cooling mediums to the compressor extraction air.

9. The method of claim 1, wherein selectively controlling at least one of the compressor extraction air or the cooling mediums based at least in part on a characteristic associated with the gas turbine is facilitated by at least one processor.

10. A system for controlling cooling of compressor extraction air in a gas turbine comprising a compressor and a turbine section, the system comprising:
   one or more storage devices operable to store a plurality of different cooling mediums; one or more distribution devices operable to:
      receive the different cooling mediums from the one or more storage devices; and inject at least a portion of the different cooling mediums prior to or during introduction of the cooling mediums into the compressor extraction air, wherein the compressor extraction air is cooled by the cooling mediums prior to introduction to the turbine section;
   one or more control devices operable to:
      determine, after injection of the different cooling mediums, an expected temperature of the compressor extraction air and a measured temperature of the compressor extraction air;
      adjust, based at least in part on a temperature difference between the expected temperature and the measured temperature, respective amounts of the cooling mediums injected into the compressor extraction air; and
      selectively control at least one of the compressor extraction air or the cooling mediums based at least in part on a characteristic associated with the gas turbine.

11. The system of claim 10, wherein the characteristic comprises at least one of: a downstream pressure in the turbine section, a downstream air temperature in the turbine section, a downstream metal temperature of a portion of the turbine section, ambient temperature, an air flow measurement associated with the compressor extraction air, a pressure measurement associated with the compressor extraction air, a temperature measurement associated with the compressor extraction air, a cooling medium flow measurement, a cooling medium temperature, a cooling medium pressure, or any combination thereof.

12. The system of claim 10, wherein selectively controlling at least one of the compressor extraction air or the different cooling mediums based at least in part on a characteristic associated with the gas turbine comprises at least one of the following: controlling the amount of each of the cooling mediums introduced to the compressor extraction air, controlling the temperature each of the cooling mediums introduced to the compressor extraction air, controlling the pressure each of the cooling mediums introduced to the compressor extraction air, controlling the amount of compressor extraction air introduced to the turbine section, controlling the temperature of compressor extraction air introduced to the turbine section, controlling the pressure of compressor extraction air introduced to the turbine section, or any combination thereof.

13. The system of claim 10, wherein the one or more control devices can implement at least one of the following: an open-type loop control, an active-type control, a closed-type loop control, or a passive-type control.

14. The system of claim 10, wherein the one or more control devices comprises an open-type loop controller comprising a table with one or more predefined target characteristics associated with the gas turbine.

15. A gas turbine comprising:
a turbine section;
a compressor, wherein air is extracted from at least one portion of the compressor for introduction into the turbine section;
one or more storage devices operable to store a plurality of different cooling mediums; and
one or more distribution devices operable to:
  receive the different cooling mediums from the one or more storage devices; and
  inject at least a portion of the different cooling mediums prior to or during introduction of the cooling mediums into the air extracted from the at least one portion of the compressor, wherein the air is cooled by the cooling mediums prior to introduction to the turbine section; and
one or more control devices operable to:
  determine, after injection of the different cooling mediums, an expected temperature of the compressor extraction air and a measured temperature of the compressor extraction air;
  adjust, based at least in part on a temperature difference between the expected temperature and the measured temperature, respective amounts of the cooling mediums injected into the compressor extraction air; and
  selectively control at least one of the compressor extraction air or the cooling mediums based at least in part on a characteristic associated with the gas turbine.

16. The gas turbine of claim 15, wherein the characteristic comprises at least one of: a downstream pressure in the turbine section, a downstream air temperature in the turbine section, a downstream metal temperature of a portion of the turbine section, ambient temperature, an air flow measurement associated with the compressor extraction air, a pressure measurement associated with the compressor extraction air, a temperature measurement associated with the compressor extraction air, a cooling medium flow measurement, a cooling medium temperature, a cooling medium pressure, or any combination thereof.

17. The gas turbine of claim 15, wherein selectively controlling at least one of the compressor extraction air or the cooling mediums based at least in part on a characteristic associated with the gas turbine comprises at least one of the following:
controlling the amount of each of the cooling mediums introduced to the compressor extraction air, controlling the temperature each of the cooling mediums introduced to the compressor extraction air, controlling the pressure each of the cooling mediums introduced to the compressor extraction air, controlling the amount of compressor extraction air introduced to the turbine section, controlling the temperature of compressor extraction air introduced to the turbine section, controlling the pressure of compressor extraction air introduced to the turbine section, or any combination thereof.

18. The gas turbine of claim 15, wherein the one or more control devices can implement at least one of the following: an open-type loop control, an active-type control, a closed-type loop control, or a passive-type control.

19. The gas turbine of claim 15, wherein the one or more control devices comprises an open-type loop controller comprising a table with one or more predefined target characteristics associated with the gas turbine.

20. The gas turbine of claim 15, wherein the one or more control devices comprise at least one of the following: a processor, a software program, or a hardware component.

* * * * *